United States Patent [15] 3,652,796
Kezuka [45] Mar. 28, 1972

[54] MEANS FOR DISCRIMINATING BETWEEN ORIGINATING AND TERMINATING CALLS

[72] Inventor: Eiji Kezuka, Yokohama, Japan
[73] Assignee: Matsushita Electric Industrial Co., Ltd., Osaka, Japan

[22] Filed: Sept. 16, 1969
[21] Appl. No.: 858,280

[30] Foreign Application Priority Data

Sept. 20, 1968 Japan....................................43/69027

[52] U.S. Cl.......................................179/7.1 R, 179/18 FA
[51] Int. Cl.......................................................H04m 15/38
[58] Field of Search....................179/18 D, 18 GC, 18 F, 7.1, 179/8 R, 8 A, 9 R, 18 EB, 18 FA, 7.1 R

[56] References Cited

UNITED STATES PATENTS 2,876,290 3/1959 Harris....................................179/18 F

*Primary Examiner*—Kathleen H. Claffy
*Assistant Examiner*—Randall P. Myers
*Attorney*—Stevens, Davis, Miller & Mosher

[57] ABSTRACT

A discriminator with which the traffic of telephone circuits may be discriminated with respect to originating calls and terminating calls individually and such discrimination may be readily accomplished without interfering with the telephone rules and regulations.

5 Claims, 5 Drawing Figures

E. KEZUKA
INVENTOR

BY Stevens, Davis, Miller & Mosher
ATTORNEYS

MEANS FOR DISCRIMINATING BETWEEN ORIGINATING AND TERMINATING CALLS

This invention relates to means for discriminating between originating calls and terminating calls with which information regarding the traffic of telephone circuits can be obtained in terms of originating calls and terminating calls.

There is known a device of a similar type with which the working efficiency of the exchange is determined by counting the holding pulses. With such a known device, however, only the sum of the time for originating calls and the time for terminating calls can be obtained, and it has been difficult to known the frequency of originating calls or the frequency of terminating calls individually.

An object of the present invention is to provide means for readily discriminating between originating calls and terminating calls.

Another object of the present invention is to provide such a discriminating means which makes possible the statistical summing of the information regarding either of originating calls and terminating calls and thereby provides the total traffic information of telephone circuits in detail.

Still another object of the present invention is to provide such a discriminating means with which discrimination between originating calls and terminating calls and the detection of these calls may be accomplished without interfering with the telephone rules and regulations.

The present invention will be described in greater detail with reference to the accompanying drawings, in which.

Figure 1:
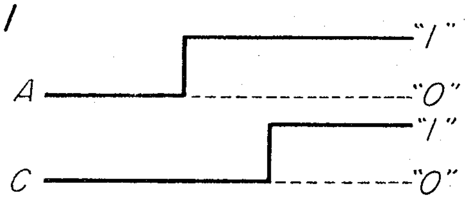
FIGS. 1 and 2 illustrate the waveforms of potential on the subscriber's line and control line in the exchange.
Figure 2:
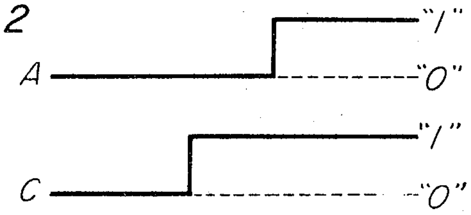

It is known that transition of potential occurs, for example, in the subscriber's line A and control line C of the exchange with respect to ground and the sequence of such transition for an originating call is as shown in FIG. 1 and that for a terminating call is as shown in FIG. 2.

For this reason, a detector for detecting a transition of potential is connected to each of the subscriber's line A and control line C in such a manner as to pass only the output of one of these detectors which is first to operate and suppress the output of the other detector which subsequently operates, whereby discrimination may be effected between an originating call and a terminating call depending on which one of the detectors operates. Thus, by integrating the time during which each detector is operating, it is possible to know the time for the originating call, the time for the terminating call and the busy time of the telephone circuit.

However, it is prohibited by the telephone regulations that a line for measurement is kept connected with the subscriber's line A.

Figure 3:
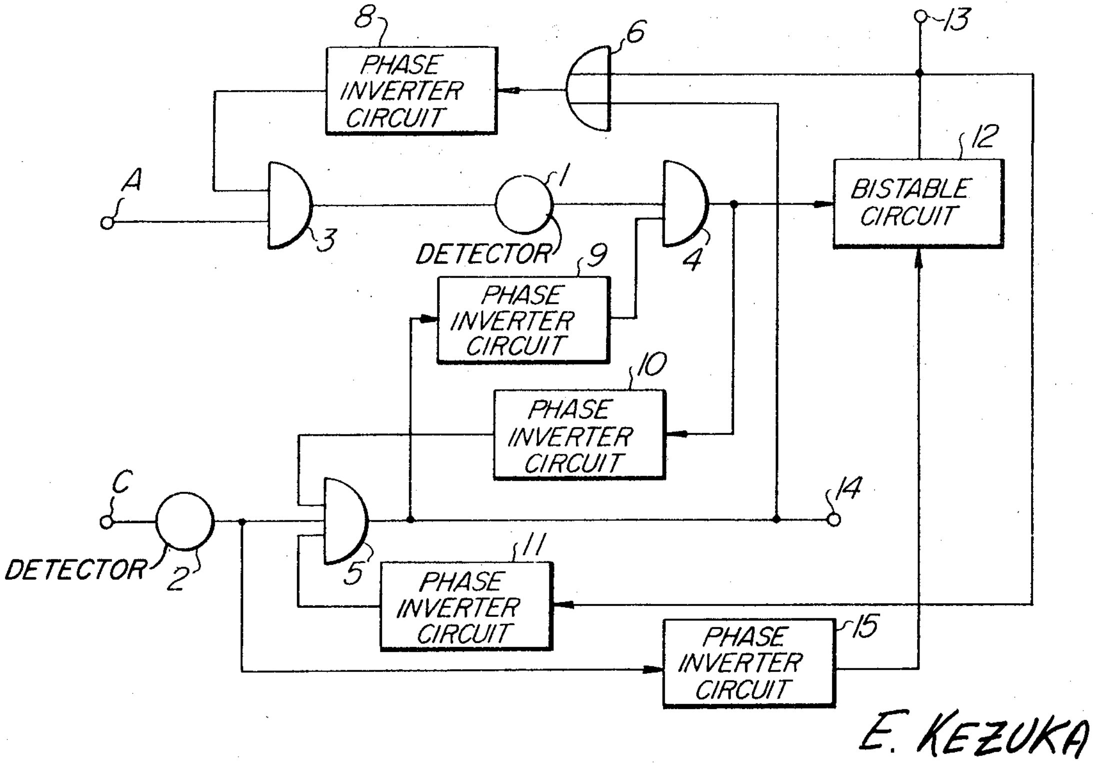
FIG. 3 is a block diagram of the discriminating means according to an embodiment of the present invention.

The present invention contemplates overcoming such inconvenience and an embodiment thereof will now be described with respect to FIG. 3.

The subscriber's line A and control line C are provided with detectors 1 and 2 for detecting any transition of potential in these respective lines with respect to ground. There are further provided AND-circuits 3, 4 and 5, OR-circuit 6, phase inverter circuits 8, 9, 10, 11 and 15, a bistable circuit 12, and output terminals 13 and 14.

In operation, when the detectors 1 and 2 are in their inoperative condition, no output is present in either of the AND-circuits 4 and 5, and the bistable circuit 12 is in its reset state with zero output appearing at the output terminals 13 and 14.

If the detector 2 first operates, all of the three inputs to the AND-circuit 5 assume a value "1" since the outputs of the phase inverter circuits 10 and 11 are "1", and accordingly the output of the AND-circuit 5 also becomes "1" to thereby provide an output "1" at the output terminal 14.

On the other hand, the output of the AND-circuit 5 is applied through the OR-circuit 6 to the phase inverter circuit 8 feeds a "0" input to the AND-circuit 3. This means that the detector 1 does not operate even in the presence of any transition of potential in the subscriber'2 line A. Accordingly, the bistable circuit 12 will not operate.

When the detector 2 returns to its original state or its inoperative state, the output appearing at the output terminal 14 becomes "0."

As a result, the time for the terminating call can be determined by adding the time during which the signal at the output terminal 14 is "1."

When a transition of potential first occurs in the subscriber's line A but not in the control line C, all the inputs to the AND-circuit 3 become "1" since the output of the phase inverter circuit 8 is "1", and the output of the AND-circuit also becomes "1" to thereby actuate the detector 1. Since the output of the phase inverter circuit 9 is also "1", the AND-circuit 4 provides an output "1" to thereby actuate the bistable circuit 12. Thus, the output appearing at the output terminal 13 becomes "1". However, the operation of the detector 1 causes the outputs of the phase inverter circuits 10 and 11 to be "0", so that the AND-circuit 5 will remain inoperative and a "0" signal will appear at the output terminal 14 even if the output of the detector 2 is applied to the AND-circuit 5.

The operation of the bistable circuit 12 causes the output of the phase inverter circuit 8 to be "0", whereby the subscriber's line A is disconnected from the detector 1 by the AND-circuit 3 and the bistable circuit 12 is reset by the output "1" of the phase inverter circuit 15 when the output of the detector 2 turns to "0."

Consequently, the time for the originating call can be determined by adding the time during which the bistable circuit 12 is operating. Also, the total busy time can be determined as the sum of the time for the originating call and the time for the terminating call.

Further, the fact that the connection between the subscriber's line and its associated detector is cut off immediately after a transition of potential is detected in the subscriber's line A means that the means of the present invention does not interfere with the telephone regulations.

Figure 4:
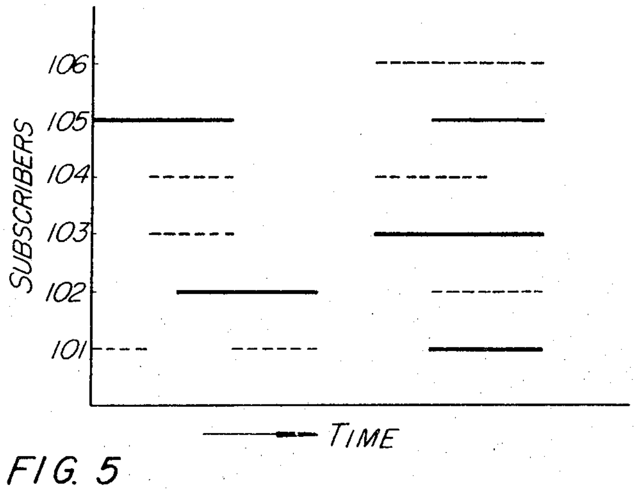
FIG. 4 is a graph showing an example of originating calls and terminating calls over several subscriber's lines.
Figure 5:
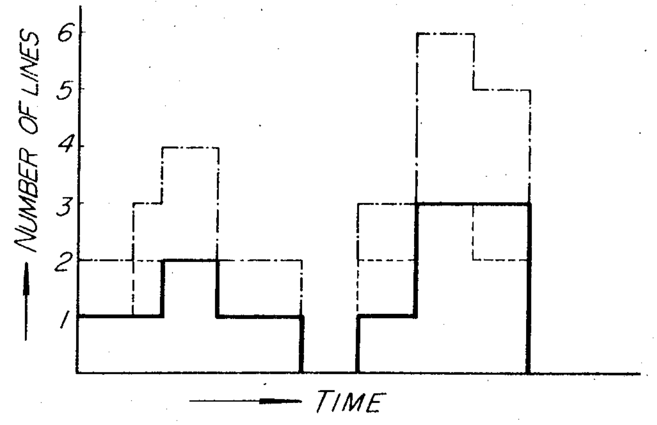
FIG. 5 is a graph illustrating traffic information obtained by summing up the data shown in FIG. 4.

FIG. 4 shows an example of traffic over six subscriber's lines 101 to 106 in terms of the time for originating calls (solid lines) and the time for terminating calls (dotted lines). FIG. 5 shows a traffic information obtained by summing up the FIG. 4 data, the solid line representing the frequency of originating calls, the dotted line representing the frequency of terminating calls, and the dot-and dashline representing the sum thereof or the busy time.

According to the present invention, as has been disclosed above, the traffic of the telephone circuits can be discriminated with respect to originating calls and terminating calls and the signals thus discriminated can be supplied to a register means, whereby the time for originating calls and that for terminating calls can be measured individually, as shown in FIGS. 4 and 5. This provides more useful information concerning efficiency or utility factor of the exchange than provided by the prior art device which is directed only to the measurement of the busy time.

I claim:

1. Apparatus for discriminating between originating and terminating calls for use with automatic telephone exchange equipment having at least one subscriber line and an exchange control line corresponding to said subscriber line, comprising:

a first detector connected to said control line;

first gate means connected to the output of said first detector;

a second detector connected to said at least one subscriber line;

first means to inhibit the output of said second detector when a signal appears on said control line at a time prior to the appearance of a corresponding signal on said corresponding subscriber line, including means connecting the output of said first gate means to the input of said second detector; and second means to inhibit the output of said first gate means when a signal appears on said at least one subscriber line at a time prior to the appearance of a corresponding signal on said corresponding control line, including means connecting the output of said second detector to the input of said first gate means.

2. The apparatus according to claim 1, wherein said first inhibiting means comprises a first phase inverter circuit connected to the output of said first gate means and means connecting the output of said first phase inverter circuit to the input of said second detector; and wherein said second inhibiting means comprises a second phase inverter circuit, means connecting the output of said second detector to the input of said second phase inverter circuit and means connecting the output of said second phase inverter circuit to the input of said first gate means.

3. The apparatus according to claim 2, further comprising:

a bistable circuit;

means connecting the outputs of said first and second detectors to the input of said bistable circuit;

third means connecting said output of said bistable circuit to the input of said second detector; and fourth means connecting the output of said bistable circuit to the input of said first gate means.

4. The apparatus according to claim 3, wherein said third means comprises means connecting said bistable circuit output to the input of said first phase inverter circuit; and said fourth means comprises a third phase inverter circuit connected to said bistable circuit output, the output of said third phase inverter circuit being connected to the input of said first gate means; and wherein said means connecting the output of said first detector to the input of said bistable circuit comprises a fourth phase inverter circuit having its input connected to the output of said first detector and its output connected to the input of said bistable circuit.

5. The apparatus according to claim 4, further comprising:

second gate means having a first input connected to said at least one subscriber line, and a second input connected to the output of said first phase inverter circuit, and having its output connected to the input of said second detector;

third gate means having a first input connected to the output of said second detector, the output of said third gate means being connected to the input of said second phase inverter circuit and to the input of said bistable circuit; and a fifth phase inverter circuit having its input connected to the output of said first gate means and its output connected to a second input of said third gate means.

* * * * *